United States Patent [19]

Engibarov

[11] Patent Number: 4,759,244

[45] Date of Patent: Jul. 26, 1988

[54] ADJUSTABLE QUICK CHANGE TOOL HOLDER

[76] Inventor: Eddy Z. Engibarov, 616 Onderdonk Ave., Ridgewood, N.Y. 11385

[21] Appl. No.: 452,892

[22] Filed: Dec. 27, 1982

[51] Int. Cl.⁴ .............................................. B23B 3/36
[52] U.S. Cl. .................................. 82/34 B; 82/36 R; 407/87
[58] Field of Search ............ 82/36 R, 36 B, 37, 34 A, 82/34 B; 407/85, 86, 87

[56] References Cited

U.S. PATENT DOCUMENTS

| 950,222 | 2/1910 | Cluley et al. | 407/87 |
| 3,280,673 | 10/1966 | Holmes et al. | 82/36 R |
| 3,311,005 | 3/1967 | Nix | 82/36 R |
| 3,359,840 | 12/1967 | Soleau | 82/36 R |
| 3,382,746 | 5/1968 | Tucker | 82/36 R |
| 3,425,305 | 2/1969 | Cocco | 82/36 R |
| 3,555,943 | 1/1971 | Papp | 82/37 |
| 3,731,565 | 5/1973 | Barkhurst | 82/36 R |
| 3,738,206 | 6/1973 | Parsons | 82/37 |

Primary Examiner—Nicholas P. Godici
Attorney, Agent, or Firm—Helfgott & Karas

[57] ABSTRACT

An adjustable quick change tool holder having an elongated arbor for insertion into a machining apparatus. A tool support member is supported on the arbor. The tool support member releasably supports a cutting tool axially adjustable with respect to the longitudinal axis of the arbor. Guide means is provided for transversely adjusting the tool support member with respect to the arbor. A releasable securing mechanism is included for securing the tool support member at a desired transverse position. The cutting tool is thereby easily adjustable in two mutually perpendicular directions and can easily be replaced.

4 Claims, 1 Drawing Sheet

4,759,244

ADJUSTABLE QUICK CHANGE TOOL HOLDER

BACKGROUND OF THE INVENTION

This invention relates to a tool holder, and more particularly to an adjustable tool holder which can be retained in the clamp of a machining apparatus and which permits for quick change of the cutting tool.

Typical machining apparatus, such as metal cutting machines, wood shaping machines, etc., require the insertion of cutting tools as needed for the particular machining operation being conducted on the workpiece. During the course of the operation, it may also become necessary to change the cutting tools as they become dull or in order to modify the particular type of operation being conducted on the workpiece. It is accordingly required to continuously change cutting tools in particular types of machining apparatus.

Most of the machining apparatus presently available includes a clamping mechanism for retaining an arbor supporting the cutting tool. However, it is a difficult and time consuming task to change the cutting tool. Additionally, such changing of the cutting tool must usually be carried out by accessing a particular side of the machining apparatus. However, because of the particular positioning of the apparatus it may be inconvenient to gain access to the side of the apparatus needed for changing the tool.

The changing of tools also requires an accurate adjustment of the position of the cutting tool which requires considerable manipulation, is time consuming and often difficult to accomplish with the desired degree of accuracy.

SUMMARY OF THE INVENTION

It is accordingly an object of the present invention to provide an adjustable quick change tool holder which avoids the aforementioned problems of prior art devices.

Another object of the present invention is to provide a tool holder which can be positioned within the clamp of a machining apparatus, which permits adjustability of the tool holder with respect to the machining apparatus in two mutually perpendicular directions.

Still another object of the present invention is to provide a tool holder which can be retained in a machining apparatus by means of an arbor, and which permits adjustability of the tool with respect to the machining apparatus in two mutually perpendicular directions.

Still a further object of the present invention is to provide a tool holder which can be positioned within a machining apparatus and which permits quick changing of cutting tools.

Yet another object of the present invention is to provide an adjustable quick change tool holder retained by a machining apparatus, which can be reversibly positioned to permit manipulation from either side of the apparatus.

Briefly, in accordance with the present invention, there is provided an adjustable quick change tool holder having an elongated arbor which can be inserted into a machining apparatus and held therein by means of appropriate clamping arrangements provided in the machining apparatus. A tool support member is provided for releasably supporting a cutting tool and permitting axial adjustability of the cutting tool with respect to the longitudinal axis of the arbor. A guiding mechanism is provided for transversely adjusting the tool support member with respect to the arbor. Releasably securing means are included for releasably securing the tool support member at a desired transverse position with respect to the arbor.

In an embodiment of the invention, the tool support member comprises a housing block having a U-shaped channel extending longitudinally thereacross with clamping screws extending exteriorly through a side wall of the housing block into the channel. The tool can be axially adjusted along the channel and can extend cantilevered from either end of the housing block.

The guiding mechanism can include a guide and way arrangement positioned on the confronting surfaces between the housing block and the arbor with the guide portion extending upwardly from the arbor and the way portion formed into the housing block. An upwardly extending abuttment projects from the guide portion and can travel through a channel formed into one side of the housing block and extending partially across the way portion. An adjusting screw extends from the other side of the housing block into the channel for engaging the abuttment. Rotation of the adjusting screw causes the block to slide transversely by means of the guide and way arrangement so as to transversely position the housing block with respect to the arbor. A locking screw at one end of the housing block locks the housing block to the arbor at the desired transverse position.

The aforementioned objects, features and advantages of the invention will, in part, be pointed out with particularity, and will, in part, become obvious from the following more detailed description of the invention taken in conjunction with the accompanying drawing, which forms an integral part thereof.

BRIEF DESCRIPTION OF THE DRAWING

In the drawings

In the various figures of the drawings, like reference characters designate like parts.

DESCRIPTION OF THE PREFERRED EMBODIMENT

Figure 1:
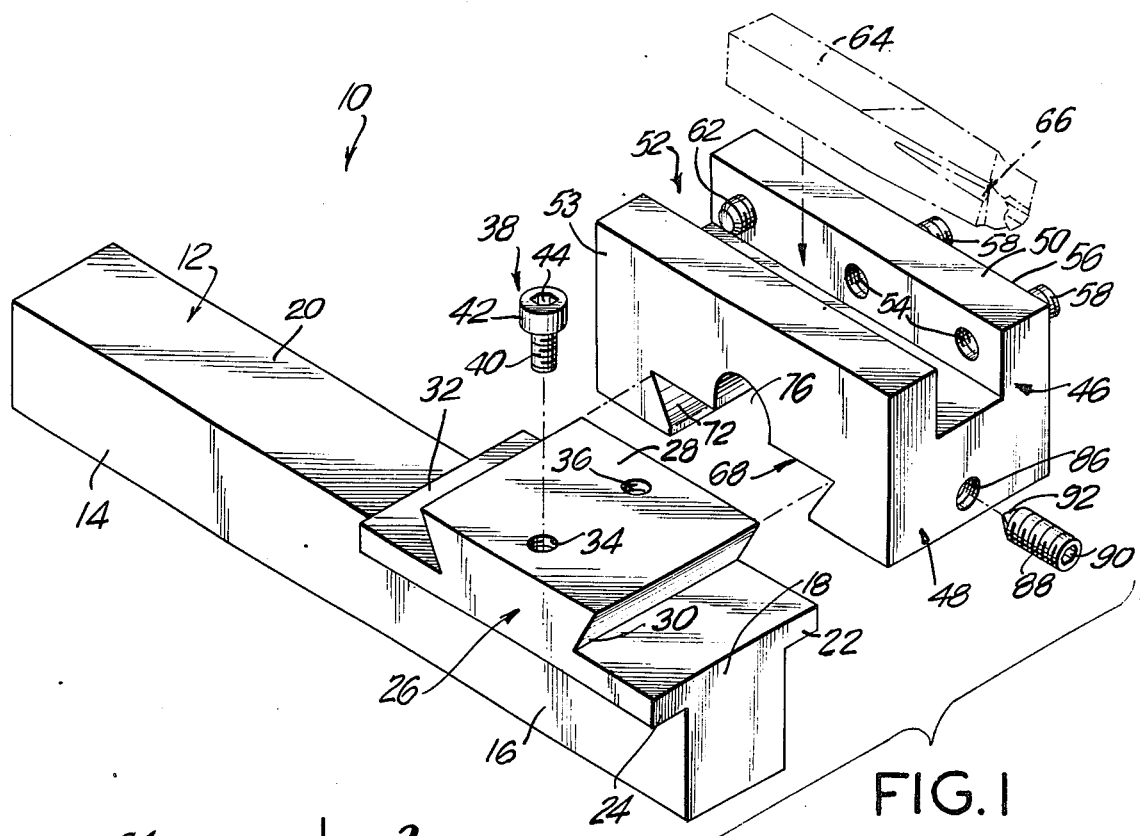
FIG. 1 is a perspective, exploded view of the adjustable quick change tool holder in accordance with the present invention.
Figure 2:
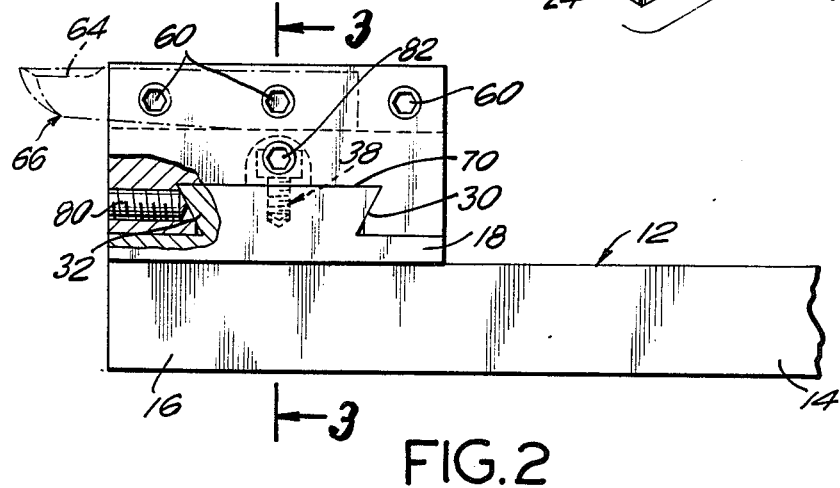
FIG. 2 is a side elevational view, partially broken away, showing the assembled parts of the adjustable quick change tool holder of the present invention.

Referring now to the drawings, the adjustable quick change tool holder of the present invention is shown generally at 10 and comprises an arbor 12 shown as an elongated rectangular member having a rear section 14 which can be retained by a suitable clamping arrangement provided on a machining apparatus. Such machining apparatus can be a metal working machine, a cutting machine, a wood shaping machine, etc. Almost all of these machines have clamping arrangements which can support the arbor 12.

At the forward section 16 of the arbor 12 there is formed a base 18 which sits onto the upper surface 20 of the arbor 12. The base 18 is wider than arbor 12 so as to have laterally extending wings 22, 24 which are extending beyond the arbor 12.

Upwardly projecting from the base 18 is provided a V-shaped guide 26 having an upper surface 28 with undercut sections 30, 32 on either side thereof. Formed into the upper surface 28 of the guide 26 are a pair of spaced apart tapped holes 34, 36, each respectively positioned along the center line of the guide 26 and adjacent the lateral edges thereof. An abuttment 38 is provided for respectively threading into either one of the tapped holes 34, 36. The abuttment 38 is shown as a screw having a threaded shank portion 40 with an enlarged head 42 and a hex shaped recess 44 counter sunk into the head 42 to permit manipulation of the abuttment screw 38 by means of a hex shaped angle wrench (not shown).

A tool support member, shown generally at 46, is provided in the form of a block 48 having an upper surface 50 into which is formed an elongated U-shaped channel 52 extending longitudinally across the entire length of the block 48. Three spaced apart tapped holes 54 are formed into one side wall 56 extending into the channel and each receiving a clamping screw 58 therein. The clamping screws 58 are longitudinal body members having external threads and including a hex recess 60 counter sunk into one end thereof. The other end 62 is flattened to permit clamping against a flat side surface of a cutting tool 64, shown in phantom.

The cutting tool 64 can be inserted into the elongated U-shaped channel 52 with the cutting edge 66 extending axially beyond one end thereof. The clamping screws 58 are then tightened by inserting a suitable hex wrench into the screw 58 to clamp the screws against the side of the cutting tool 64 and secure it in place in the U-shaped channel. It should be appreciated, that the tool 64 can be oriented so that it extends axially from either end of the support block, as is desired. This feature permits reversing of the support block with respect to the arbor, as will hereinafter be described.

Upwardly extending into the bottom of the support block 48 is a way 68 matingly corresponding to the projecting guide 26. The way 68 includes an upper surface 70 with angled side surfaces 72, 74 for fitting into the undercuts 30, 32 of the guide portion 26.

A semicircular channel 76 is formed into the upper surface 70 of the way 68 having an open end mouth 78 extending from one side 53 of the support block 48 and extending transversely partially across the width of the block. An adjusting screw 80 extends from the opposing side 56 of the support block 48 into the channel 76. The adjusting screw 80 includes an externally threaded cylindrical body portion with a hex shaped recess 82 counter sunk into one end thereof for receiving a hex wrench to rotate the adjusting screw 80. The opposing end of the screw 80 is flattened at 84 to engage the head 42 of the abuttment 38 when it is inserted in one of the tapped holes 34, 36.

A threaded hole 86 is formed into one end of the support block 48 for receiving a locking screw 88. The locking screw includes an externally threaded cylindrical body portion having a hex shaped recess 90 counter sunk into one end thereof and a pointed tip 92 at the other end thereof. The locking screw 88 is received into the threaded hole 86 and can abut the undercut 30 on the guide 26 to lock the support block 48 in place along the guide 26 after it is appropriately adjusted at its proper transverse position with respect thereto.

Although not shown, another screw 88 can be provided at the opposing end of the support block for locking against the other undercut 32.

Figure 3:
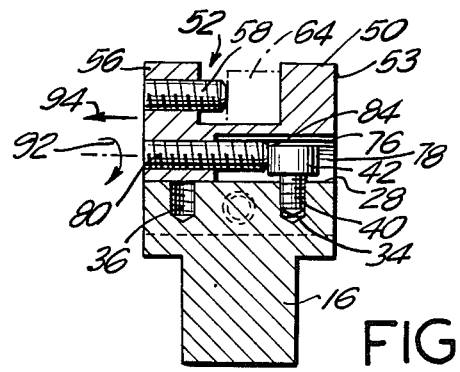
FIG. 3 is a cross sectional view taken along lines 3—3 of FIG. 2.

In operation, a cutting tool 64 is inserted into the U-shaped channel 52 and locked in place by means of the clamping screws 58 so that its cutting head 66 extends axially from one end of the U-shaped channel 52. The abuttment 38 is threaded into one of the two apertures 34, 36 in the guide 26. The tool support member 46 is then slid onto the guide 26 so that the channel 76 is facing towards the abuttment and the channel can receive the abuttment therein. The adjusting screw 80 is then rotated as shown by the arrow 92 in FIG. 3, so that the tool support member 46 is transversely slid as shown by the arrow 94, by means of the guide and way arrangement. The adjustment positions the tool at a suitable transverse position. The locking screw 88 is then tightened to lock the tool support member 46 in place.

It will therefore be appreciated that a cutting tool 64 can be adjusted in two mutually perpendicular directions. The first direction constitutes the axial direction corresponding to the axis of the arbor 12. This adjustment is achieved by means of axially positioning the tool 64 within the U-shaped channel 52 prior to its being clamped in place by means of the screws 58. The other direction represents the transverse direction wherein adjustment is achieved by means of the adjusting screw 80 moving the entire tool holder 46 transversely across the guide 26.

With the positioning of the abuttment 38 into the tapped hole 34, the adjusting screw 58 extends from the right side of the tool support member, as shown in FIG. 1. However, the abuttment 38 can also be inserted into the tapped hole 36. The tool holder 46 can be reversed so that the channel 76 will again face towards the abuttment. The cutting tool can be readjusted so that it axially extends from the other end of the U-shaped channel 52. This will now permit the adjusting screw 58 to extend from the left side and adjustment can now be made from the reverse side.

It should therefore be appreciated that because of the symmetries provided by the U-shaped channel 52 and the particular unique configuration shown, a reversibility is achieved between the tool holder 64 and the arbor 12 to permit reversibility of manipulation therebetween.

By way of example, the particular guide and way arrangement shown is that of a dovetail arrangement. This provides for securement between the tool holder 46 and the arbor 12 and also avoids the possibility of lifting off of the tool holder 46 from the arbor 12. However, other types of arrangements could be utilized as is well known in the machining arts.

There has been disclosed heretofore the best embodiments of the invention presently contemplated. However, it is to be understood that various changes and modifications may be made thereto without department from the spirit of the invention.

I claim:

1. An adjustable quick change tool holder, comprising: an elongated arbor for insertion into an machining apparatus;
    a summetrical tool support member having a U-shaped channel formed longitudinally therein for replaceably supporting a cutting tool projecting from either end thereof and axially adjustable with respect to the longitudinal axis of the arbor;
    a plurality of clamping screws extending from only one side of said tool support member into said channel for clamping the cutting tool within the channel;
    guide means for transversely adjusting said tool support member with respect to said arbor, said guide means comprising a transverse guide portion projecting from said arbor and a mating way portion received into said tool support member, said way portion extending transversely across the tool support member and being open at both ends thereof, an abutment projecting from said guide portion at an offset location thereof, a transverse channel open across said way portion to accommodate passage of said abutment therethrough, said channel being open at only one side of the tool support member and ending in an abutment wall, an adjusting screw extending from an opposing side of said tool support member and projecting into said channel from said abutment wall for controlling said transverse adjustment of said tool support member with respect to said arbor;

said abutment being selectively installed to permit said transverse adjustment from only one of the right or the left side of the arbor;

stop means for preventing transverse adjustment of said support member from a side opposed to the side corresponding to the selected installation of the directional means, said stop means comprising a pair of apertures symmetrically located at respective opposing sides of said guide portion and adjacent edges thereof, there being only a single abutment and said abutment being selectively insertable in only one of said apertures at a time, and said tool support member being reversible from front to back with respect to said arbor by positioning the abuttment in either one of the apertures, said abuttment wall engaging said abuttment to prevent sliding of said support means on said arbor from a side contrary to the selection determined by the insertion of the abutment in a selected aperture, whereby by front to back reversal of said tool support member, both clamping of the cutting tool and transverse adjustment of the tool support member are achieved from the same selected right or left side; and means for releasably securing said tool support member at a desired transverse position.

2. An adjustable quick change tool holder as in claim 1, wherein said guide portion and said way portion define a dovetail configuration.

3. An adjustable quick change tool holder as in claim 1, wherein said securing means comprises a locking screw extending into at least one end of said support member and locking onto the guide portion projecting from the arbor.

4. An adjustable quick change tool holder as in claim 1, and comprising a base formed on said arbor and supporting one of said mating guide and way portions.

* * * * *